United States Patent
Scholten et al.

(10) Patent No.: US 11,033,871 B2
(45) Date of Patent: Jun. 15, 2021

(54) APPARATUS FOR CONVERTING A FEED GAS INTO A PRODUCT GAS

(71) Applicant: Green Vision Holding B.V., Arnhem (NL)

(72) Inventors: Anton Scholten, Apeldoorn (NL); Gerard Westendorp, Zetten (NL); Johannes Avertanus Josef Ten Dam, Twello (NL)

(73) Assignee: Green Vision Holding B.V., Arnhem (NL)

( * ) Notice: Subject to any disclaimer, the term of this patent is extended or adjusted under 35 U.S.C. 154(b) by 8 days.

(21) Appl. No.: 16/319,658

(22) PCT Filed: Jul. 13, 2017

(86) PCT No.: PCT/NL2017/050471
§ 371 (c)(1),
(2) Date: Jan. 22, 2019

(87) PCT Pub. No.: WO2018/016945
PCT Pub. Date: Jan. 25, 2018

(65) Prior Publication Data
US 2020/0047143 A1  Feb. 13, 2020

(30) Foreign Application Priority Data
Jul. 22, 2016  (NL) ..................................... 2017215

(51) Int. Cl.
*B01J 12/00* (2006.01)
*B01J 19/00* (2006.01)
*B01J 19/24* (2006.01)

(52) U.S. Cl.
CPC ......... *B01J 12/007* (2013.01); *B01J 19/0073* (2013.01); *B01J 19/2425* (2013.01);
(Continued)

(58) Field of Classification Search
CPC . B01J 12/00; B01J 12/007; B01J 19/00; B01J 19/0053; B01J 19/0073; B01J 19/24;
(Continued)

(56) References Cited

U.S. PATENT DOCUMENTS 3,607,131 A  9/1971  Williams et al.
5,236,669 A *  8/1993  Simmons ................. F16J 15/48
                                                        220/581

(Continued)

FOREIGN PATENT DOCUMENTS

EP        2223739      9/2010
WO      200027518      5/2000

OTHER PUBLICATIONS

PCT/NL2017/050471 International Search Report and Written Opinion dated Jan. 25, 2018.

*Primary Examiner* — Natasha E Young
(74) *Attorney, Agent, or Firm* — Michael Best & Friedrich LLP (57) ABSTRACT

Apparatus for converting feed gas (28) into a product gas (29), comprising at least one reactor (1) with a reaction chamber (15) bounded by the inner wall of an outer tube (4) closed at a first outer end and an inner tube (14) received coaxially in this outer tube (4) and provided at both its outer ends with openings, which reactor (1) is provided with an inlet chamber (11) and with an outlet chamber (10), wherein a first wall (31) of the outlet chamber (10) encloses the outer tube (4) and extends therefrom, and a second wall (12) of the outlet chamber (10) lying opposite the first wall (31) encloses the outer tube (4) and extends therefrom, and the inlet chamber (11) is bounded by the second wall (12) of the outlet chamber (10) and a third wall (47) which lies opposite this second wall (12), encloses the outer tube (4) and extends therefrom.

16 Claims, 7 Drawing Sheets

(52) U.S. Cl.
CPC ............... *B01J 2219/00063* (2013.01); *B01J 2219/32408* (2013.01); *B01J 2219/32466* (2013.01)

(58) Field of Classification Search
CPC .. B01J 19/2415; B01J 19/2425; B01J 19/244; B01J 2219/00; B01J 2219/00049–00058; B01J 2219/00063; B01J 2219/32; B01J 2219/322; B01J 2219/32203; B01J 2219/3221; B01J 2219/324; B01J 2219/32408; B01J 2219/32466; C01B 3/00; C01B 3/02; C01B 3/32; C01B 3/34; C01B 3/38; Y02P 20/00; Y02P 20/10; Y02P 20/14; Y02P 20/147; Y02P 20/149
See application file for complete search history.

(56) References Cited

U.S. PATENT DOCUMENTS

| | | | |
|---|---|---|---|
| 6,667,014 B1 | 12/2003 | Szydlowski | |
| 7,115,233 B2 * | 10/2006 | Okada | .................. B01J 8/0257 422/129 |
| 2003/0101650 A1 | 6/2003 | Okada et al. | |
| 2015/0352391 A1 | 12/2015 | Ruiz et al. | |

* cited by examiner

APPARATUS FOR CONVERTING A FEED GAS INTO A PRODUCT GAS

This application is a national stage application claiming priority to PCT/NL/2017/050471, now WO2018/016945, filed Jul. 13, 2017, which claims priority to Kingdom of the Netherlands Patent Application Serial No. NL2017215, filed on Jul. 22, 2016.

The invention relates to an apparatus for converting a feed gas comprising components for reaction into a product gas, comprising at least one reactor with a reaction chamber which is provided with an inlet opening for feed gas and an outlet opening for product gas and which is bounded by the inner wall of an outer tube closed at a first outer end and the outer wall of an inner tube received coaxially in this outer tube and provided at both its outer ends with openings, which reactor is provided with an inlet chamber which is in open connection with the at least one inlet opening and with an outlet chamber in which the at least one outlet opening debauches, wherein a first wall of the outlet chamber encloses the outer tube and extends therefrom.

Such an apparatus is known as steam reformer from EP 2 223 739 A1.

In the known steam reformer a catalyst is received in the reaction chamber and the feed gas enters the inner tube, reverses direction at the end of this inner tube and flows out through the outer tube in heat-exchanging contact with an oven.

In the known steam reformer a surprisingly good heat transfer can be realized with the stated flow direction of the feed gas, wherein the temperature of the outer tube is relatively homogeneous and as much heat as possible can thus be fed to the reactor space without locally exceeding the maximum allowable tube temperature despite the fact that the heat flux is not more or less homogeneous everywhere.

It practice the known steam reformer comprises at least two reactors placed in parallel, wherein the respective inlet openings are coupled by a shared inlet manifold, and the respective outlet openings are coupled by a shared outlet manifold. In order to replace a catalyst in one of the reactors in such a steam reformer both the inlet manifold and the outlet manifold have to be disassembled. The disassembly of the two manifolds has the result that the catalysts of the other reactors also become freely accessible, this being unnecessary and undesirable. The disassembly of the two manifolds moreover takes a relatively long time.

It is an object of the invention to provide a steam reformer with a plurality of parallel reactors, wherein the reaction chambers in the respective reactors are individually accessible and wherein catalysts optionally received in these reaction chambers are individually removable.

These objects are achieved, and other advantages gained, with an apparatus of the type stated in the preamble, wherein according to the invention a second wall of the outlet chamber lying opposite the first wall encloses the outer tube and extends therefrom, and the inlet chamber is bounded by the second wall of the outlet chamber and a third wall which lies opposite this second wall, encloses the outer tube and extends therefrom, wherein the inlet opening is formed in the wall of the outer tube.

Other than in the known steam reformer, the outer tube of the reactor is not only coupled fixedly to the first wall but also to the second and the third wall. Because the outer tube is fixedly coupled to the third wall, it has in principle become possible to obtain individual access to the outer tube, for instance via a closable opening in the third wall.

In an embodiment of an apparatus according to the invention the outer tube is closed at a second outer end by a releasably coupled cover which is provided with first sealing means for sealing the cover against the outer tube, wherein the inner tube is in open connection with the inlet opening.

Provided in another embodiment of an apparatus according to the invention are second sealing means for sealing the inner tube against the outer tube in a manner such that the inner tube is in open connection with the inlet opening, and the space bounded by the outer tube and the inner tube is in open connection with the outlet opening.

In order to prevent the cover being pressed away outward in longitudinal direction of an outer tube in the case of overpressure in the reaction chamber, the apparatus is provided in an embodiment with securing means for securing the cover against a movement of the outer tube in longitudinal direction away from the reaction chamber.

An apparatus with a cover provides the option of sampling the reaction products in the reaction chamber when this apparatus is provided with a gas outlet conduit extending through the cover and debouching in the reaction chamber of the at least one reactor. Sampling of reaction products in a reaction chamber provides particular advantage in an apparatus with a number of reactors which are each equipped with a gas outlet conduit debouching in the reaction chamber.

In a practical advantageous embodiment the apparatus is provided with a third tube extending through the cover for inserting a temperature sensor therein.

The practical advantages of an apparatus according to the invention become particularly manifest in an embodiment wherein the reaction chamber comprises a catalyst material which is provided for instance on at least a part of a carrier foil enclosed by the outer tube.

In order to enlarge the effective surface area of the carrier foil, this foil for instance has in a cross-section through the inner and the outer tube a periodic structure of successive peaks and valleys.

In a subsequent embodiment the at least one reactor is provided along a part of the inner tube with a heat exchanger for transfer of heat from product gas flowing out of the reactor chamber to feed gas supplied through the inner tube, which heat exchanger is provided by a first heat exchanger element bounded by the inner wall of the inner tube and a second heat exchanger element corresponding to this first heat exchanger element and arranged round the outer wall of the inner tube.

An optimal transfer of heat from incoming cold feed gas to outgoing hot product gas is realized with the first and second heat exchanger elements.

In order to utilize heat still remaining in the outgoing product gas, a part of the outer tube is provided in a particularly advantageous embodiment with a liquid conduit formed round this part and with a third heat exchanger element received in this part for the transfer of heat from product gas flowing out of the reaction chamber to a liquid flowing through this liquid conduit.

In practical situations the liquid is preferably water so that heat from product gas flowing out of the reaction chamber is transferred to water flowing through a water conduit, thus forming steam which can be utilized in a production process.

A heat exchanger element in an apparatus according to the invention is for instance provided by a foil of a heat conductive material, this foil having in a cross-section through the respective tube a periodic structure of successive peaks and valleys.

The advantages of an apparatus according to the invention become particularly manifest in an embodiment in which it comprises at least two reactors placed in parallel, wherein the respective inlet chambers are provided by a shared inlet manifold, and the respective outlet chambers are provided by a shared outlet manifold.

In an embodiment which is particularly advantageous in practice the number of parallel reactors amounts to $3n^2-3n+1$, wherein n is a whole number $2 \leq n \leq 13$, which reactors in a cross-section are placed adjacently in parallel rows within a regular hexagon, wherein a first outer row comprises n reactors and each subsequent row comprises one reactor more up to a maximum of 2n−1 reactors, after which each subsequent row comprises one reactor less up to a second outer row lying opposite the first outer row, which second outer row comprises n reactors.

For instance for the value n=3 the number of reactors according to this embodiment amounts to 19, which in a cross-section are placed adjacently within a regular hexagon in parallel rows of respectively three, four, five, four and three reactors.

The placing of the parallel reactors in this latter embodiment is highly cost-saving and compact, wherein the reaction chambers are however quickly and readily accessible, for instance for maintenance or repair.

An apparatus according to the invention is preferably provided with a heating means, for instance a burner or an oven, for heating the at least one reaction chamber.

An apparatus according to the invention is particularly suitable as steam reformer for converting in an endothermic reaction a feed gas comprising organic compounds and water vapour into a product gas substantially comprising carbon dioxide and hydrogen. The apparatus is likewise suitable for converting components of a feed gas in an exothermic reaction, for instance as Fischer-Tropsch reactor for synthesizing hydrocarbons.

It is noted that the terms "inlet" and "outlet" in this description and the appended claims serve only to define a flow direction but are otherwise selected at random, and can also be understood to mean respectively "outlet" and "inlet".

The invention will be elucidated hereinbelow on the basis of exemplary embodiments and with reference to the drawings.

In the drawings

Corresponding components are designated in the figures with the same reference numerals.

Figure 1:
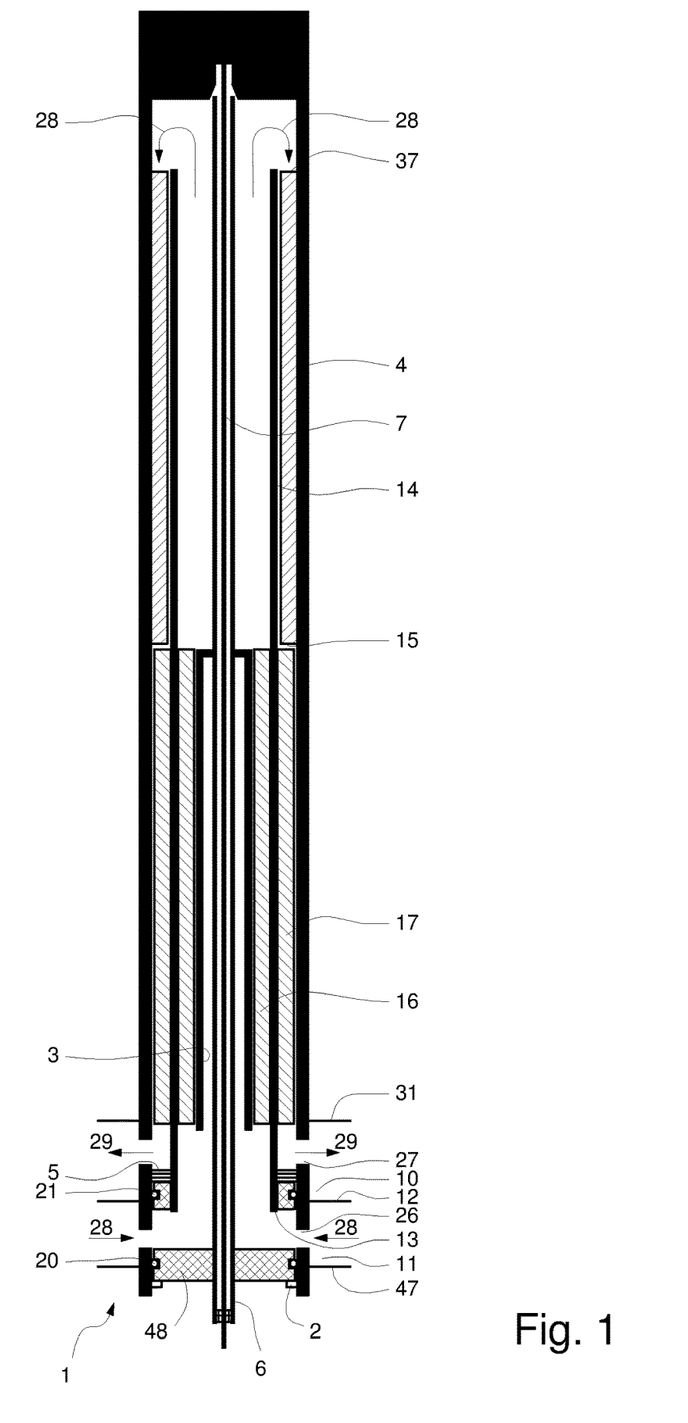
FIG. 1 shows a schematic axial section of a reactor for a first embodiment of an apparatus according to the invention.

FIG. 1 shows a reactor 1 for an apparatus (steam reformer) according to the invention in an axial section which intersects two of the inlet openings 13, 26 and outlet openings 27 referred to below. Reactor 1 is formed by an outer tube 4 closed at its top and an inner tube 14 which is received coaxially therein and which is open at its top and provided on its underside with inlet openings 13, wherein the inner wall of outer tube 4 and the outer wall of inner tube 14 bound a reaction chamber 15, the upper part of which is filled with a catalyst on a carrier foil 37. Reactor 1 is provided with an inlet chamber 11 which is in open connection with an inlet opening 26 formed in outer tube 4, and with an outlet chamber 10 into which debouches an outlet opening 27, wherein a first wall 31 of outlet chamber 10 encloses outer tube 4 and extends in transverse direction thereof. A second wall 12 of outlet chamber 10 lying opposite first wall 31 likewise encloses outer tube 4 and extends in transverse direction thereof. Inlet chamber 11 is bounded by second wall 12 of outlet chamber 10 and a third wall 47 which lies opposite this second wall 12 and which likewise encloses outer tube 4 and extends in transverse direction thereof. Outer tube 4 is closed at its second (in the figure lower) outer end by a releasably coupled cover 48 provided on its periphery with gaskets 20, 21 of a high temperature-resistant material, for instance a perfluoroelastomer (Kalrez®), for sealing cover 48 against the inner wall of outer tube 4, wherein the space bounded by outer tube 4 and inner tube 14 is in open connection with outlet opening 27. Inner tube 14 is in open connection with inlet opening 26. Cover 48 is secured by means of a Seeger ring 2 against a movement of outer tube 4 in longitudinal direction away from reaction chamber 15. Inner tube 14 is provided on its inner side with a first heat exchanger element 16 for heating incoming feed gas (represented by arrows 28) and is enveloped on its outer side in the upper part by a catalyst carrier 37, and is provided in the lower part with a second heat exchanger element 17 for cooling outgoing product gas (represented by arrows 29). Extending through cover 48 is a third tube 6 for insertion of a temperature sensor 7 therein. The figure also shows a positive-displacement tube 3 by means of which incoming feed gas 28 is guided through first heat exchanger element 16, and a number of heat-insulating gaskets 5. By releasing Seeger ring 2 the inner tube 14, which is connected fixedly to cover 48, can be pulled with cover 48 out of outer tube 4, wherein the catalyst carrier 37 becomes directly accessible.

Figure 2:
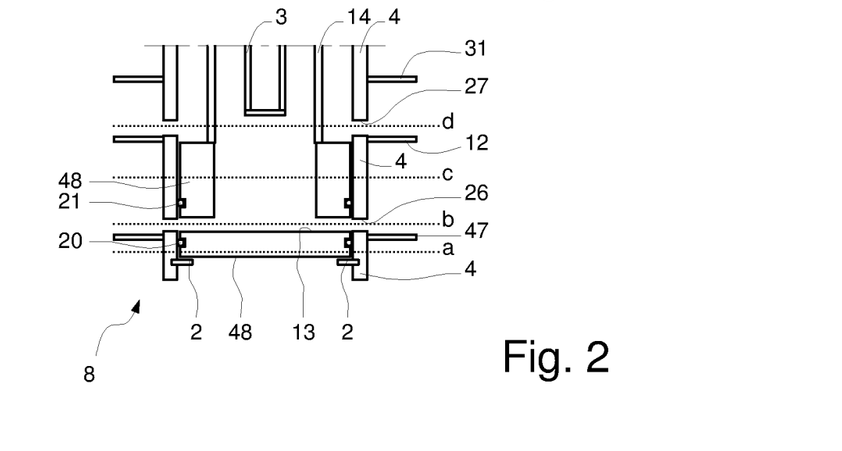
FIG. 2 shows a schematic axial section of a part of a reactor for a second embodiment of an apparatus according to the invention.
Figure 2A:
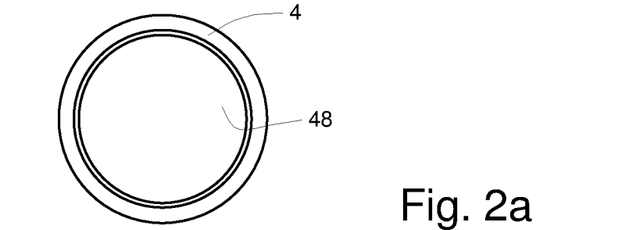
FIGS. 2a, 2b, 2c, 2d are respective cross-sections of the reactor shown in FIG. 2.
Figure 2B:
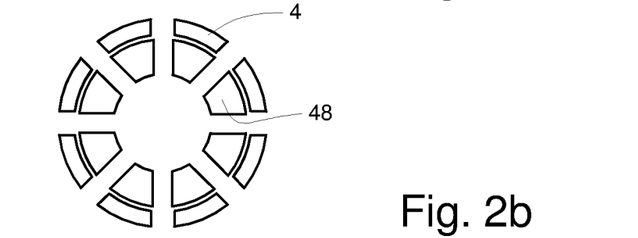
Figure 2C:
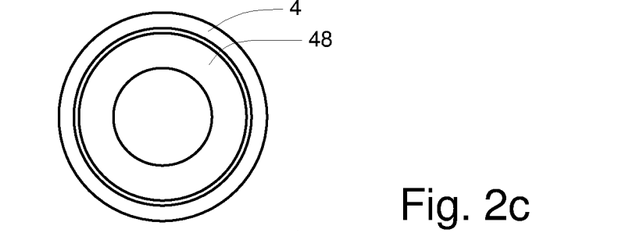
Figure 2D:
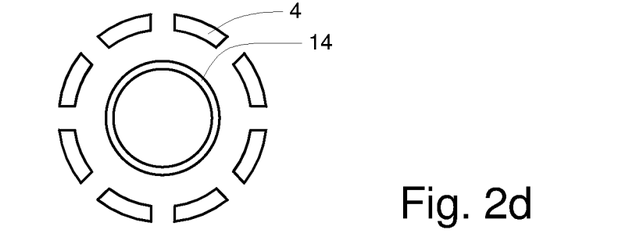

FIG. 2 shows a part of a reactor 8 in an axial section which intersects two inlet openings 13, 26 and outlet openings 27. Other than in reactor 1 shown in FIG. 1, a third tube for a temperature sensor extending through the cover is omitted, and positive-displacement tube 3 does not extend as far as cover 48.

FIGS. 2a, 2b, 2c and 2d show cross-sections through reactor 8 along respective broken lines a, b, c, d in FIG. 2.

Figure 3:
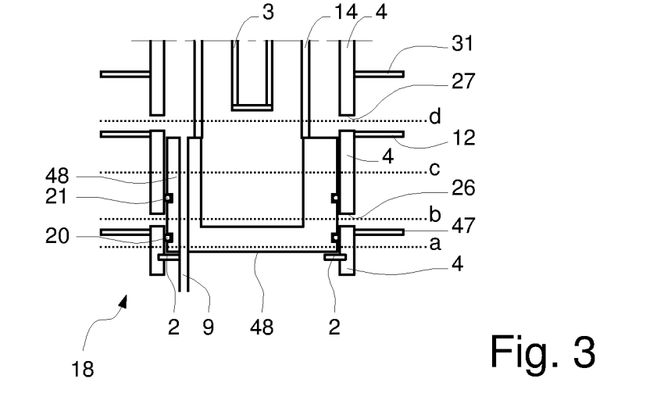
FIG. 3 shows a schematic axial section of a part of a reactor for a third embodiment of an apparatus according to the invention.
Figure 3A:
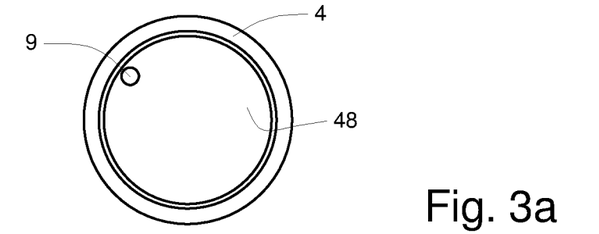
FIGS. 3a, 3b, 3c, 3d are respective cross-sections of the reactor shown in FIG. 3.
Figure 3B:
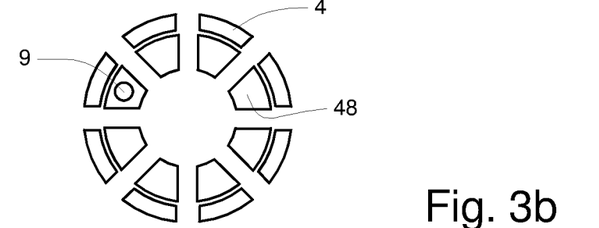
Figure 3C:
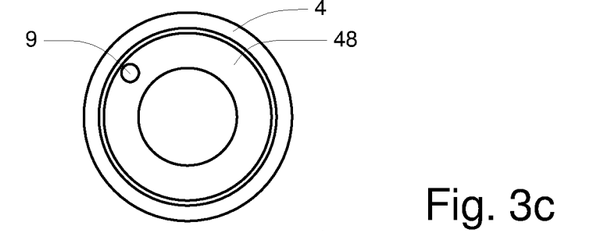
Figure 3D:
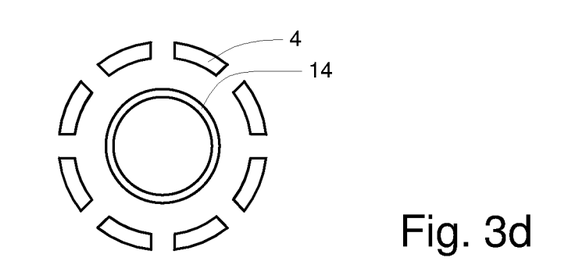

FIG. 3 shows a part of a reactor 18 in an axial section which intersects two inlet openings 13, 26 and outlet openings 27. Other than in reactor 8 shown in FIG. 2, reactor 18 is provided with a gas outlet conduit 9 extending through cover 48 and debauching in the reaction chamber.

FIGS. 3a, 3b, 3c and 3d show cross-sections through reactor 18 along the respective broken lines a, b, c, d in FIG. 3.

Figure 4:
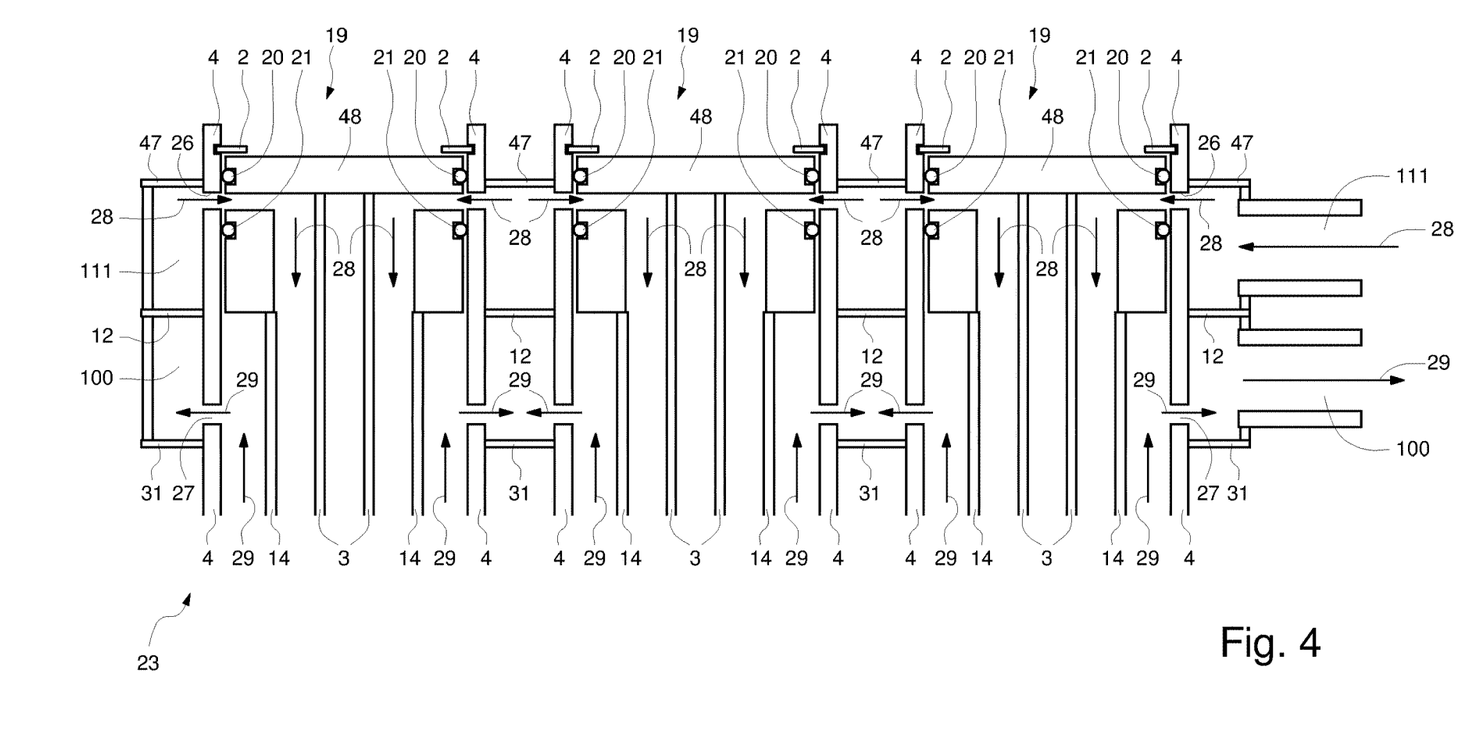
FIG. 4 shows a schematic axial section of a part of a fourth embodiment of an apparatus according to the invention.

FIG. 4 shows a steam reformer 23 with three reactors 19 connected in parallel in an axial section which intersects two inlet openings 26 and outlet openings 27 of the respective reactors 19. The view of steam reformer 23 is rotated 180° relative to the reactors shown in FIGS. 1, 2, 3. Other than in reactor 1 shown in FIG. 1, a third tube for a temperature sensor extending through the cover is in this example omitted in reactors 19. The respective inlet chambers of the reactors placed in parallel are formed by a shared inlet manifold 111, and the respective outlet chambers are formed by a shared outlet manifold 100.

Figure 5:
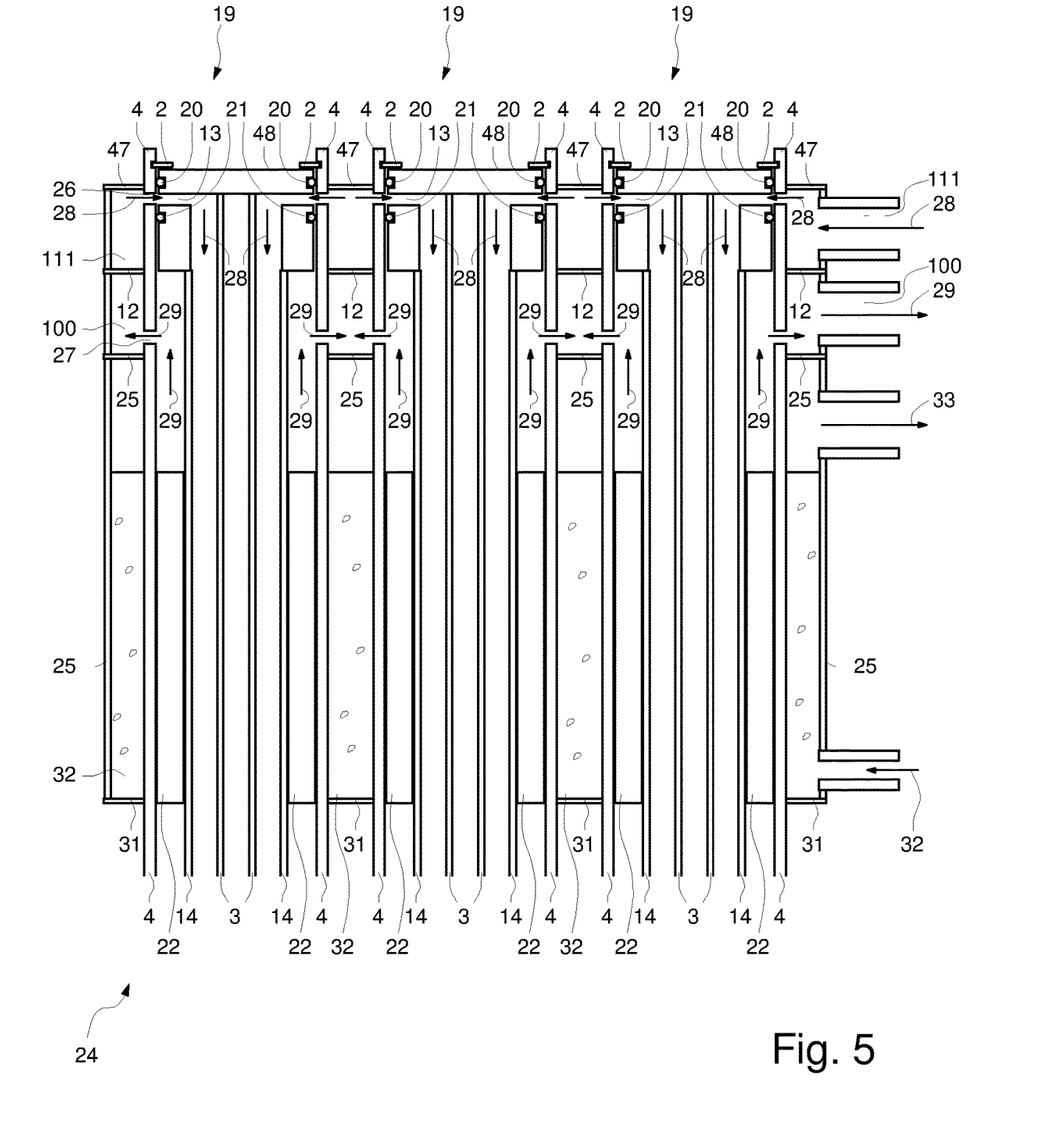
FIG. 5 shows a schematic axial section of a part of a fifth embodiment of an apparatus according to the invention.

FIG. 5 shows a steam reformer 24 with three reactors 19 connected in parallel in an axial section which intersects two inlet openings 13, 26 and outlet openings 27 of the respective reactors 19. In steam reformer 24 a part of outer tubes 4 is provided with a liquid conduit formed round this part, in this case a water conduit 25, and with a third heat exchanger element 22 received in this part for the transfer of heat from product gas flowing out of the reaction chamber to water 32 flowing through this water conduit, thus forming steam 33.

Figure 6:
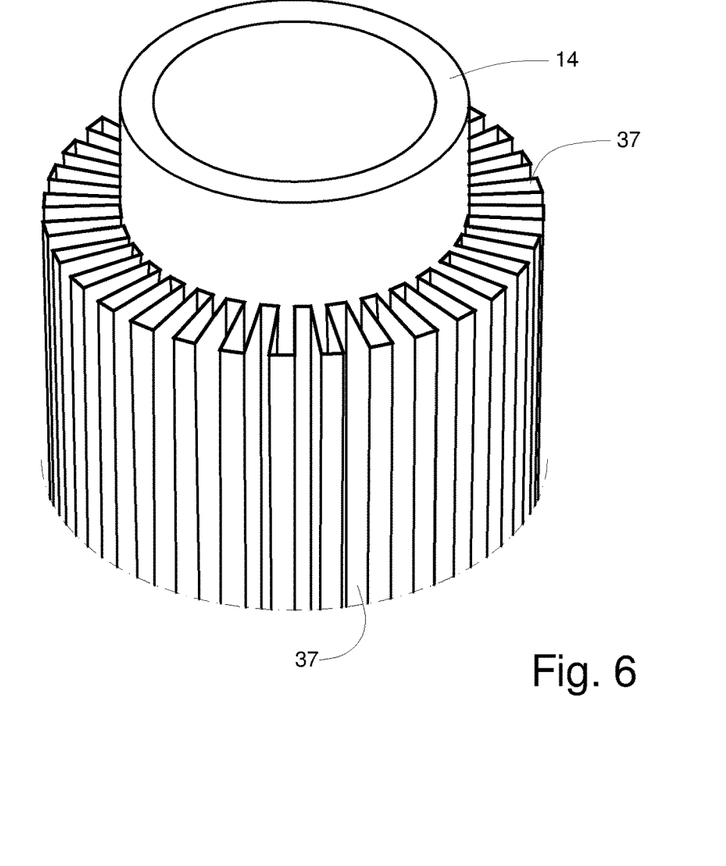
FIG. 6 is a perspective view of a part of a detail of a reactor of an apparatus as shown in FIG. 1 and FIG. 2.

FIG. 6 shows a part of an inner tube 14 around which a metal carrier foil 37 with a catalyst layer is arranged, this foil having in a cross-section through the inner tube a periodic structure of successive peaks and valleys.

Figure 7:
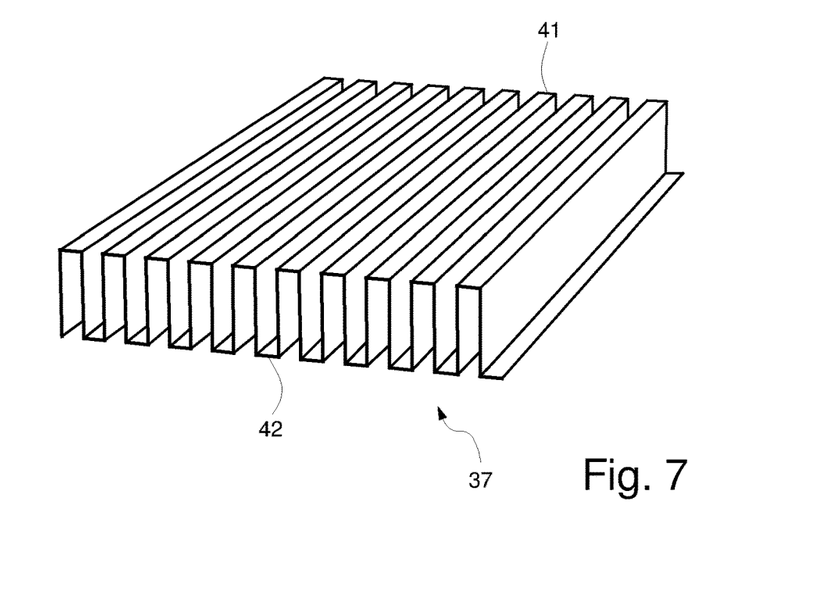
FIG. 7 is a perspective view of a first embodiment of a folded carrier foil for a catalyst.

FIG. 7 shows foil 37 of FIG. 3 in a situation before being arranged round tube 14, wherein peaks 41 and valleys 42 form a rectangular crenellation in a cross-section.

Figure 8:
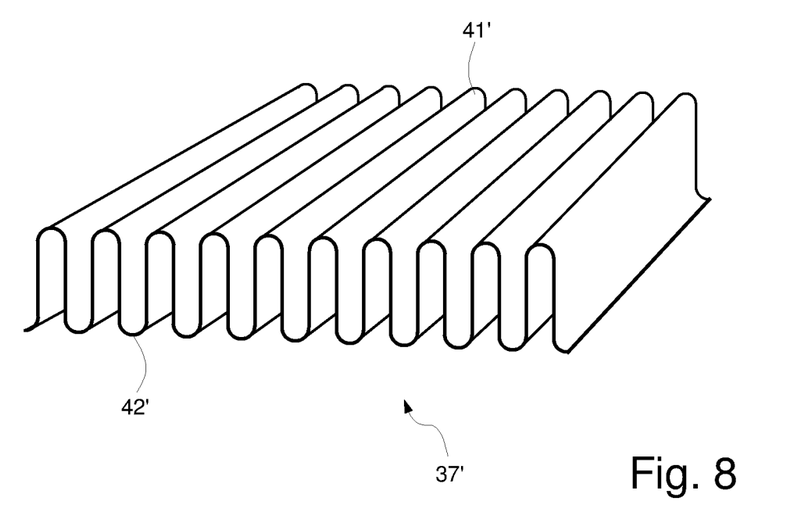
FIG. 8 is a perspective view of a second embodiment of a folded carrier foil for a catalyst.

FIG. 8 shows a second embodiment of a foil 37' in a situation before being arranged round a tube 14, wherein peaks 41' and valleys 42' have a regular wave pattern in a cross-section.

Figure 9:
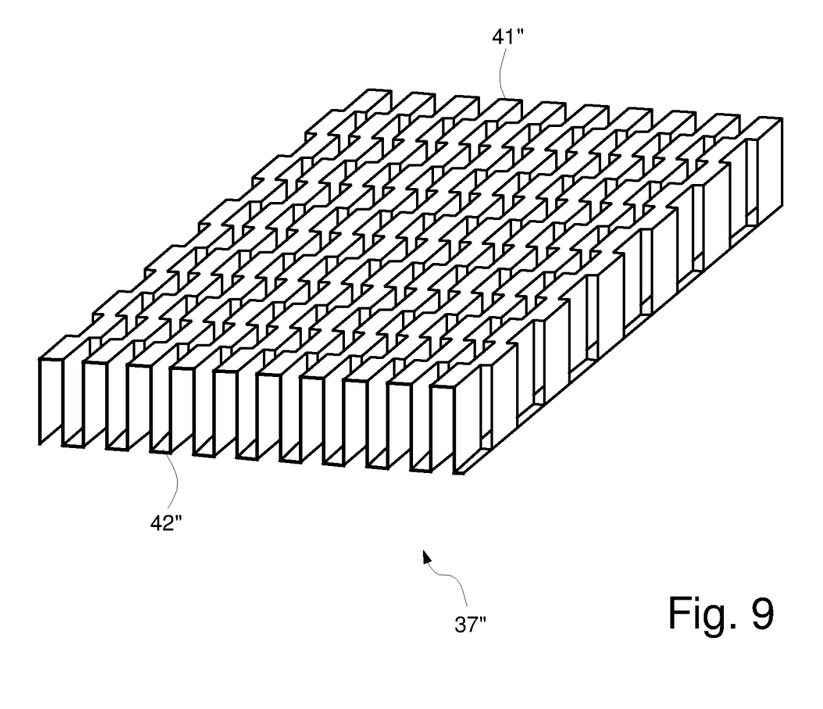
FIG. 9 is a perspective view of a third embodiment of a folded carrier foil for a catalyst.

FIG. 9 shows a third embodiment of a foil 37" in a situation before being arranged round a tube 14, wherein peaks 41" and valleys 42" form a rectangular crenellation in a cross-section as well as in axial direction.

The invention claimed is:

1. An apparatus for converting a feed gas having components for reaction into a product gas, the apparatus comprising:
at least one reactor with a reaction chamber which is provided with an inlet opening for feed gas and an outlet opening for product gas and which is bounded by the inner wall of an outer tube closed at a first outer end and the outer wall of an inner tube received coaxially in this outer tube and provided at both its outer ends with openings, which reactor is provided with an inlet chamber which is in open connection with the at least one inlet opening and with an outlet chamber in which the at least one outlet opening debouches, wherein a first wall of the outlet chamber encloses the outer tube and extends therefrom;
a second wall of the outlet chamber lying opposite the first wall encloses the outer tube and extends therefrom, wherein
the inlet chamber is bounded by the second wall of the outlet chamber and a third wall which lies opposite this second wall, encloses the outer tube and extends therefrom, wherein the inlet opening is formed in the wall of the outer tube.

2. The apparatus as claimed in claim 1, wherein the outer tube is closed at a second outer end by a releasably coupled cover which is provided with first sealing means for sealing the cover against the outer tube, wherein the inner tube is in open connection with the inlet opening.

3. The apparatus as claimed in claim 2, further comprising a second sealing means for sealing the inner tube against the outer tube in a manner such that the inner tube is in open connection with the inlet opening, and the space bounded by the outer tube and the inner tube is in open connection with the outlet opening.

4. The apparatus as claimed in claim 2, further comprising gaskets of a high temperature-resistant material for securing the cover against a movement of the outer tube in longitudinal direction away from the reaction chamber.

5. The apparatus as claimed in claim 2, further comprising a gas outlet conduit extending through the cover and debouching in the reaction chamber of the at least one reactor.

6. The apparatus as claimed in claim 2, further comprising a third tube extending through the cover for inserting a temperature sensor therein.

7. The apparatus as claimed in claim 2, wherein the reaction includes a catalyst material.

8. The apparatus as claimed in claim 7, wherein the catalyst material is provided on at least a part of a carrier foil enclosed by the outer tube.

9. The apparatus as claimed in claim 8, wherein the carrier foil has in a cross-section through the inner and the outer tube a periodic structure of successive peaks and valleys.

10. The apparatus as claimed in claim 2, wherein the at least one reactor is provided along a part of the inner tube with a heat exchanger for transfer of heat from product gas flowing out of the reactor chamber to feed gas supplied through the inner tube, which heat exchanger is provided by a first heat exchanger element bounded by the inner wall of the inner tube and a second heat exchanger element corresponding to this first heat exchanger element and arranged round the outer wall of the inner tube.

11. The apparatus as claimed in claim 2, wherein a part of the outer tube is provided with a liquid conduit formed round this part and with a third heat exchanger element received in this part for the transfer of heat from product gas flowing out of the reaction chamber to a liquid flowing through this liquid conduit.

12. The apparatus as claimed in claim 9, wherein the respective heat exchanger element is provided by a foil of a heat conductive material, this foil having in a cross-section through the respective tube a periodic structure of successive peaks and valleys.

13. The apparatus as claimed in claim 12, further comprising at least two reactors placed in parallel, wherein the respective inlet chambers are provided by a shared inlet manifold, and the respective outlet chambers are provided by a shared outlet manifold.

14. The apparatus as claimed in claim 13, wherein the number of parallel reactors amounts to $3n^2-3n+1$, wherein n is a whole number $2 \leq n \leq 13$, which reactors in a cross-section are placed adjacently in parallel rows within a regular hexagon, wherein a first outer row comprises n reactors and each subsequent row comprises one reactor more up to a maximum of $2n-1$ reactors, after which each subsequent row comprises one reactor less up to a second outer row lying opposite the first outer row, which second outer row comprises n reactors.

15. The apparatus as claimed in claim 14, further comprising a heating means for heating the at least one reaction chamber.

16. The apparatus as claimed in claim 15, wherein the feed gas includes organic compounds and water vapor and the product gas substantially includes carbon dioxide and hydrogen.

* * * * *